(12) United States Patent
Lee

(10) Patent No.: US 7,961,411 B2
(45) Date of Patent: Jun. 14, 2011

(54) LENS BARREL AND OPTICAL DEVICE WITH THE SAME

(75) Inventor: Chan-ho Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 12/715,474

(22) Filed: Mar. 2, 2010

(65) Prior Publication Data

US 2010/0226023 A1 Sep. 9, 2010

(30) Foreign Application Priority Data

Mar. 3, 2009 (KR) .................. 10-2009-0018115

(51) Int. Cl.
*G02B 7/02* (2006.01)
(52) U.S. Cl. ........................ 359/819; 359/808
(58) Field of Classification Search ............. 59/819
See application file for complete search history.

(56) References Cited

U.S. PATENT DOCUMENTS

2002/0012178 A1* 1/2002 Noguchi ............... 359/811

* cited by examiner

*Primary Examiner* — Ricky L Mack
*Assistant Examiner* — James C Jones
(74) *Attorney, Agent, or Firm* — Drinker Biddle & Reath LLP

(57) ABSTRACT

To easily combine a lens holding barrel with a mobile barrel, or separate the lens holding barrel from the mobile barrel, and to protect the lens holding barrel in an assembling process, a lens barrel and an optical device including the same are provided. The lens barrel includes: a first barrel including: a first cylinder that includes a lens and is cylindrical, and a first flange formed around an outer surface of the first cylinder; and a second barrel including: a second cylinder that is cylindrical and aligned with respect to the first cylinder, a second flange that is formed on an inner surface of the second cylinder and supports one surface of the first flange, and a plurality of supports that protrude from the inner surface of the second cylinder in a direction parallel to a surface of the second flange and support another surface of the first flange.

14 Claims, 6 Drawing Sheets

LENS BARREL AND OPTICAL DEVICE WITH THE SAME

CROSS-REFERENCE TO RELATED PATENT APPLICATION

This application claims the benefit of Korean Patent Application No. 10-2009-0018115, filed on Mar. 3, 2009, in the Korean Intellectual Property Office, the disclosure of which is incorporated herein in its entirety by reference.

BACKGROUND

The present invention relates to a lens barrel and an optical device including the same, and more particularly, to a lens barrel that is useful as a front lens barrel and an optical device including the same.

Among lens holding barrels used in cameras, camcorders, and beam projectors, front lens holding barrels need to be very carefully mounted on mobile barrels not to cause any change in the lens array.

For conventional front lens holding barrels, lens holding barrels are mounted on mobile barrels and then fixed using an elastic fixing cover.

However, when elastic fixing covers are mounted, the lens array is changed, and also problems may arise in assembling, exchanging, or repairing processes.

SUMMARY

The present invention provides a lens barrel that is easily assembled with or separated from a mobile barrel without damage, and an optical device including the same.

According to an aspect of the present invention, there is provided a lens barrel including: a first barrel including: a first cylinder that includes a lens and is cylindrical, and a first flange formed around an outer surface of the first cylinder; and a second barrel including: a second cylinder that is cylindrical and aligned with respect to the first cylinder, a second flange that is formed on an inner surface of the second cylinder and supports one surface of the first flange, and a plurality of supports that protrude from the inner surface of the second cylinder in a direction parallel to a surface of the second flange and support another surface of the first flange.

The first flange may include a third flange that is inserted or removed from between the second flange and the supports when the first barrel is rotated.

The first flange may include a stopper on an end of the third flange to prevent the rotation of the first barrel.

The length of at least a portion of the first flange may be less than an interval between adjacent supports.

The second cylinder may include a connecting hole through which a screw or a pin passes, and the first flange may include a connecting notch formed correspondingly to the connecting hole.

A portion of the screw or pin inserted into the connecting hole may be located in the connecting recess.

The supports may be flat members that protrude from the inner surface of the second cylinder, and that each includes a protrusion that protrudes from a surface of the flat members facing the first flange and supports the another surface of the first flange.

According to another aspect of the present invention, there is provided an optical device including: a lens barrel including: a first barrel including: a first cylinder that includes a lens and is cylindrical, and a first flange formed around an outer surface of the first cylinder, and a second barrel including: a second cylinder that is cylindrical and aligned with respect to the first cylinder, a second flange that is formed on an inner surface of the second cylinder and supports one surface of the first flange, and a plurality of supports that protrude from the inner surface of the second cylinder in a direction parallel to a surface of the second flange and support another surface of the first flange; and a main body on which the lens barrel is mounted.

The first flange may include a third flange that is inserted or removed from between the second flange and the supports when the first barrel is rotated.

The first flange may include a stopper on an end of the third flange to prevent the rotation of the first barrel.

A length of at least a portion of the first flange may be less than an interval between adjacent supports.

The second cylinder may include a connecting hole through which a screw or a pin passes, and the first flange includes a connecting notch formed correspondingly to the connecting hole.

A portion of the screw or pin inserted into the connecting hole may be located in the connecting recess.

The supports may be flat members that protrude from the inner surface of the second cylinder, and each of the supports includes a protrusion that protrudes from a surface of the flat members facing the first flange and supports the another surface of the first flange.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, exemplary embodiments of the present invention will be described in detail with reference the attached drawings.

Figure 1:
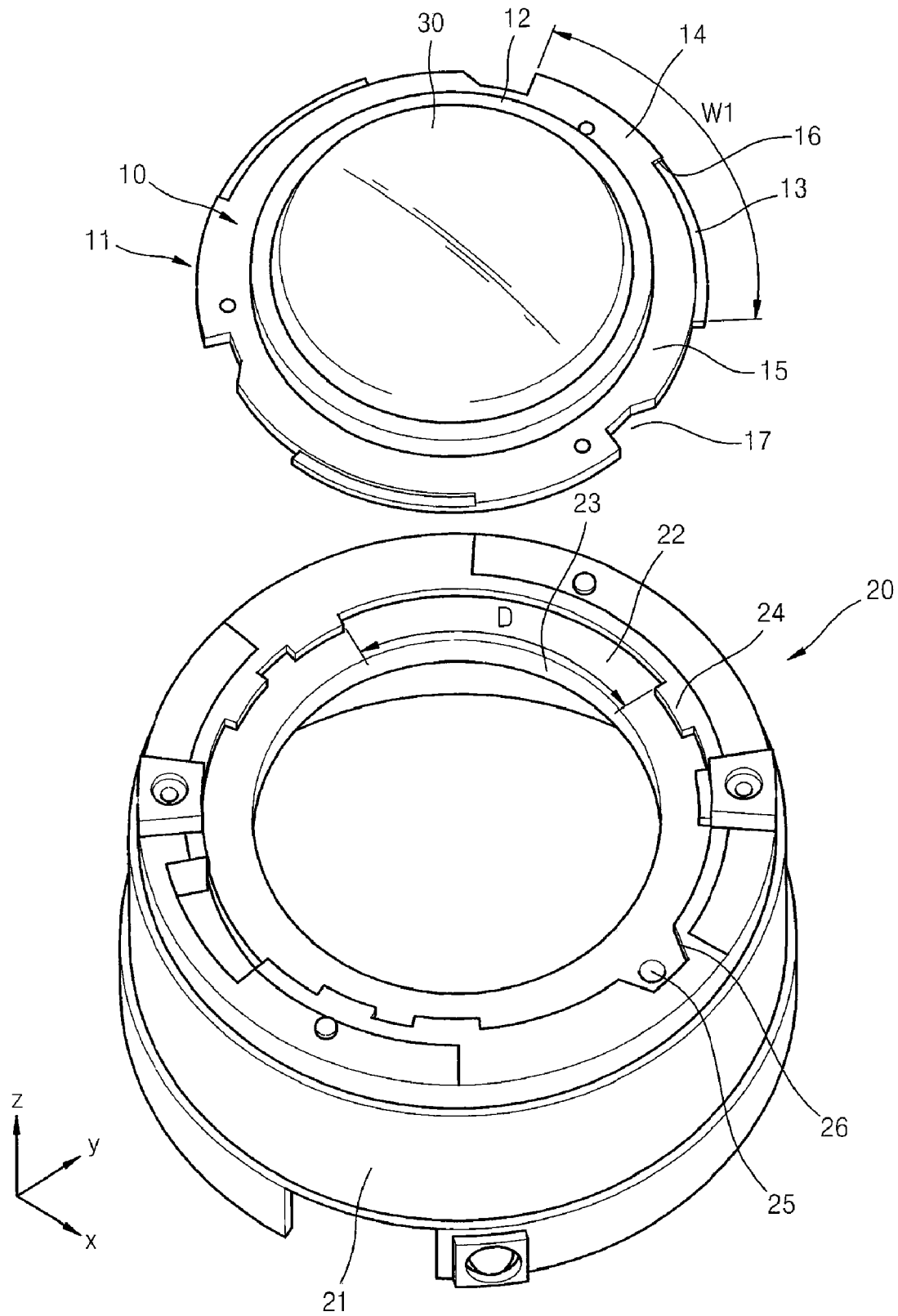
FIG. 1 is an exploded perspective view of a lens barrel according to an embodiment of the present invention.

FIG. 1 is an exploded perspective view of a lens barrel according to an embodiment of the present invention.

Referring to FIG. 1, the lens barrel according to the present embodiment includes a first barrel 10 and a second barrel 20.

A lens 30 is mounted on the first barrel 10, and the first barrel 10 is assembled with and fixed to the second barrel 20.

The first barrel 10 includes: a first cylinder 12 that has a through hole and is cylindrical; and a first flange 11 that is formed around an outer surface of the first cylinder 12.

The lens 30 is mounted on an inner surface of the first cylinder 12, and may include a plurality of lenses.

The first flange 11 protrudes from the outer surface of the first cylinder 12. The first flange 11 is flat and is perpendicular to a surface of the first cylinder 12.

According to an exemplary embodiment of the present invention, the first flange 11 includes a fifth flange 15 formed on the outer surface of the first cylinder 12, and third and fourth flanges 13 and 14 further protruding from the fifth flange 15 to the outside.

The fifth flange 15 is a flat member formed around the entire outer surface of the first cylinder 12. The third flange 13 and the fourth flange 14 further protrude from an outer surface of the fifth flange 15 in a direction parallel to a surface of the fifth flange 15 and are flat.

The third flange 13 and the fourth flange 14 have different steps with each other and are connected to the fifth flange 15. That is, the third flange 13 has a step with respect to the surface of the fifth flange 15 in a Z direction and is connected to the fifth flange 15. A surface of the fourth flange 14 and the surface of the fifth flange 15 lie in the same plane. The step between the third flange 13 and the fourth flange 14 is a stopper 16.

The fifth flange 15 further has a connecting notch 17. The connecting notch 17 has a predetermined depth in a direction from the outer circumference of the fifth flange 15 to the outer surface of the first cylinder 12.

The second barrel 20 includes: a second cylinder 21 that has a through hole and is cylindrical; and a second flange 22 formed around an inner surface of the second cylinder 21.

The second cylinder 21 is hollow and has a predetermined thickness.

The second flange 22 protrudes in a direction from the inner surface of the second cylinder 21 to the center of the through hole and is flat. The second flange 22 is formed on the entire inner surface of the second cylinder 21. The inner surface of the second flange 22 is a hollow member 23.

The second flange 22, as illustrated in FIG. 1, may be disposed more inside than an entrance of the second cylinder 21 facing the first barrel 10, and supports 24 are disposed at the entrance of the second cylinder 21 and are separated from the second flange 22 by a predetermined distance. Thus, a predetermined space is formed between the second flange 22 and the supports 24.

As illustrated in FIG. 1, the supports 24 are arranged at predetermined intervals at the entrance of the second cylinder 21 facing the first barrel 10. The supports 24 may be disposed in pairs. In other embodiments, the supports 24 may be disposed in such a way that every three supports form one group. In the present embodiment, a distance D between adjacent pairs of supports 24 is greater than a sum W1 of arcs of the third flange 13 and fourth flange 14 of the first barrel 10. Thus, the third flange 13 and fourth flange 14 of the first barrel 10 may be mounted between adjacent pairs of supports 24 on the second flange 22. In other embodiments, each of the supports 24 may be separated from each other by the distance D.

Meanwhile, a connecting hole 25 is a through hole that extends in a thickness direction of the second cylinder 21. The connecting hole 25 through which a screw or a pin passes, and as illustrated in FIG. 1, may be formed in the second flange 22 or a surface extended therefrom after an entrance notch 26 is formed at the entrance of the second cylinder 21.

The first barrel 10 and the second barrel 20 may be combined with each other using the following method.

Figure 2:
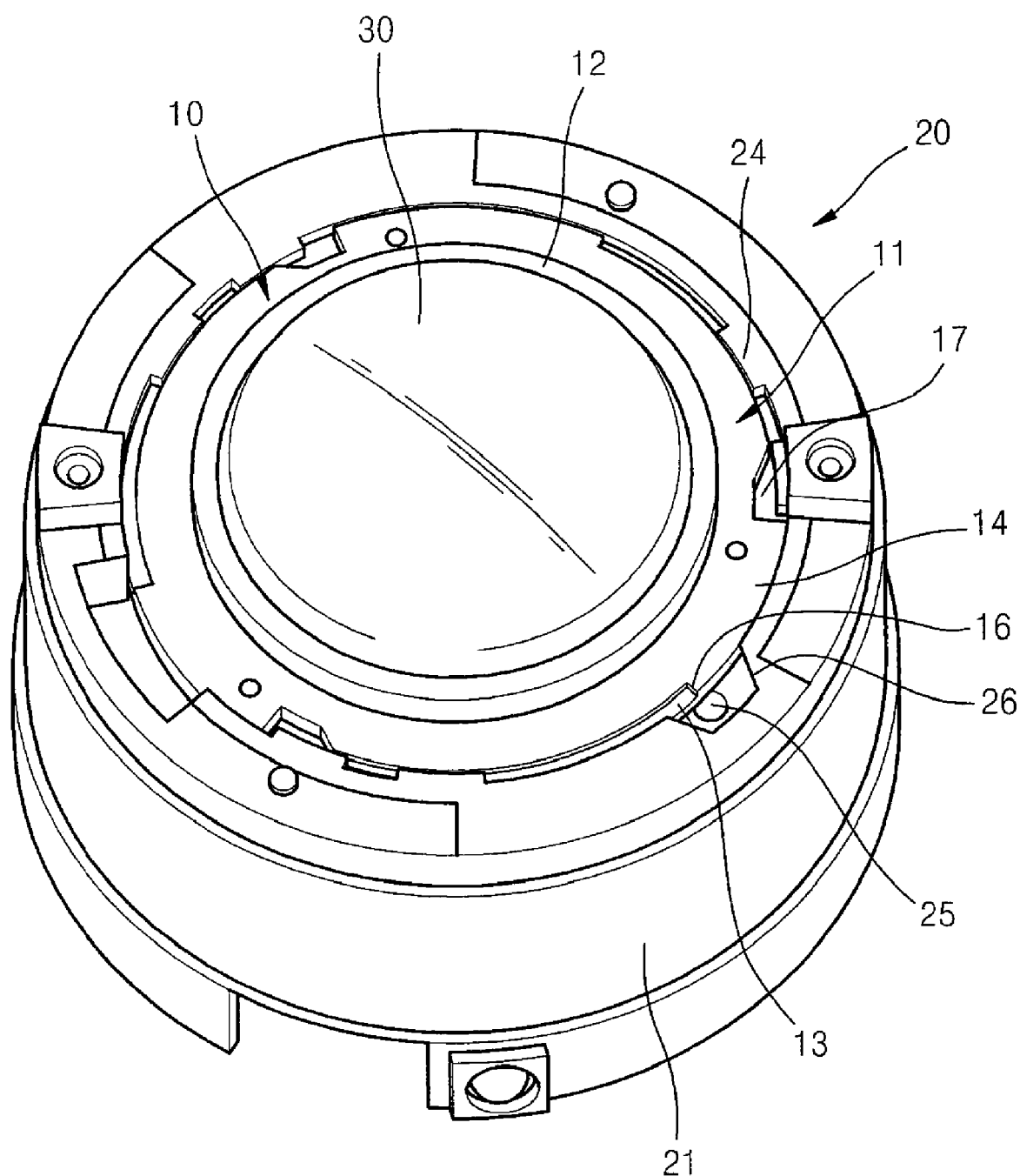
FIG. 2 is a perspective view of the lens barrel illustrated in FIG. 1, wherein the first barrel is mounted on the second barrel.

First, as illustrated in FIG. 2, the first flange 11 of the first barrel 10 is mounted on the second flange 22 of the second barrel 20. In this case, the third flange 13 and the fourth flange 14 of the first flange 11 are mounted between the supports 24, for example, between adjacent pairs of the supports 24 separated by the distance D.

Then, the first barrel 10 is rotated in such a way that the third flange 13 is inserted between the supports 24 and the second flange 22.

In this case, as described above, the stopper 16 having a step is present between the third flange 13 and the fourth flange 14. Thus, as the first barrel 10 is rotated, the stopper 16 contacts the supports 24 and thus, the rotation of the first barrel 10 stops. In addition, the third flange 13 of the first flange 11 is firmly fixed between the supports 24 and the second flange 22.

Figure 3:
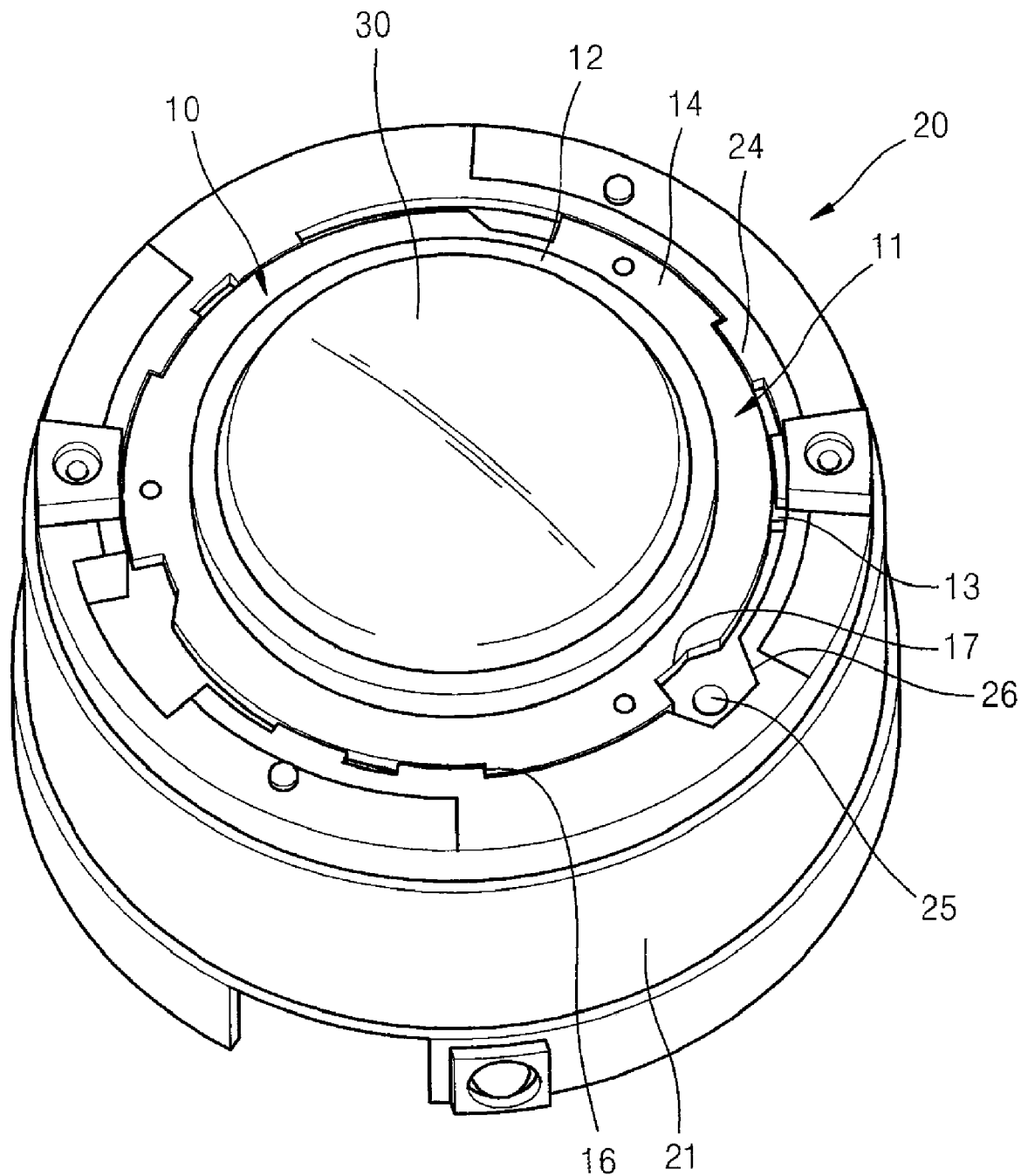
FIG. 3 is a perspective view of the lens barrel illustrated in FIG. 2 when the first barrel is rotated.

In a state in which the rotation of the first barrel 10 is stopped by the stopper 16, as illustrated in FIG. 3, the connecting hole 25 of the second cylinder 21 and the connecting notch 17 of the first flange 11 are correspondingly aligned. That is, the connecting hole 25 of the second cylinder 21 is completely exposed by the connecting notch 17 of the first flange 11.

Figure 4:
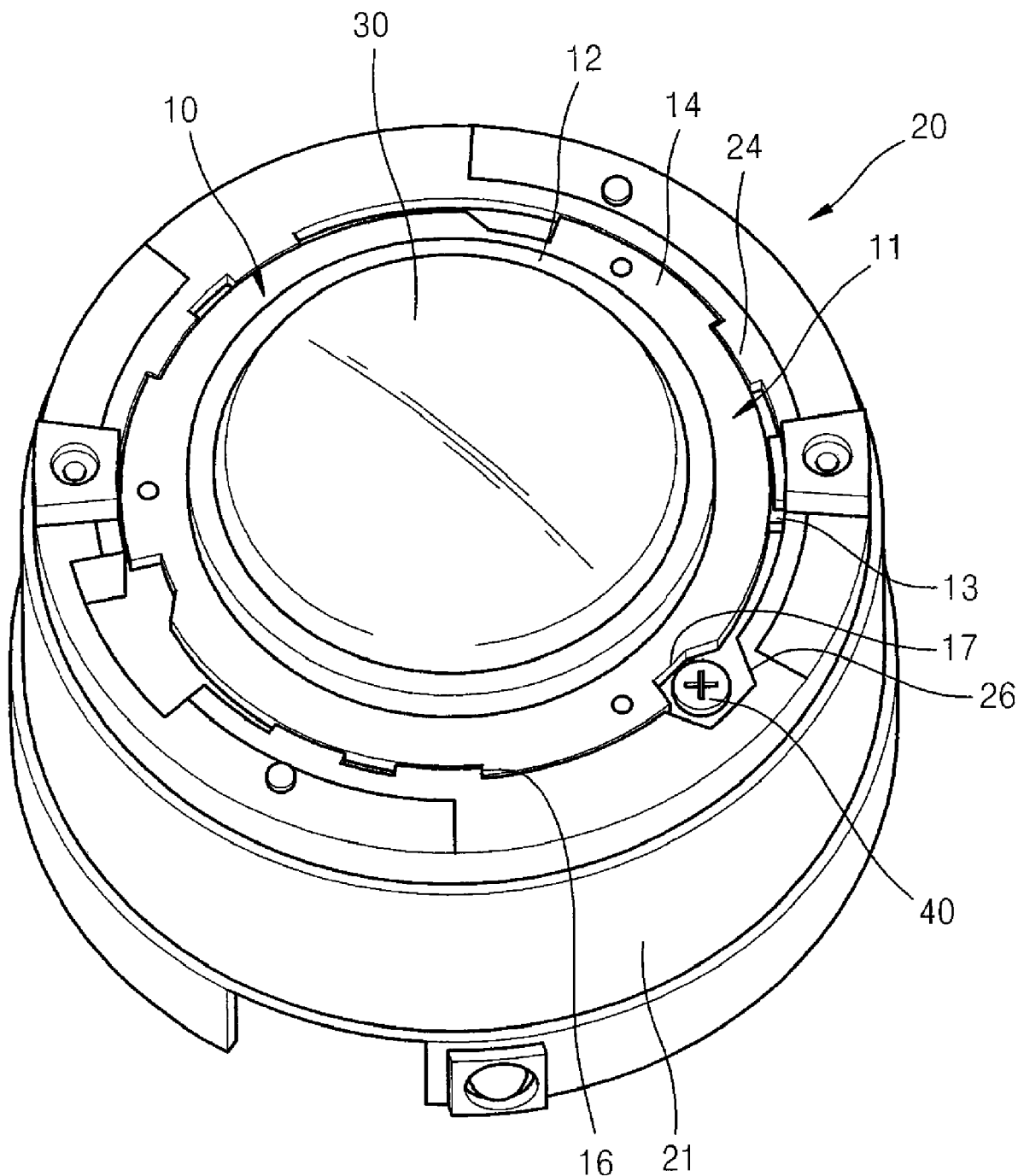
FIG. 4 is a perspective view of the lens barrel illustrated in FIG. 2 when a screw is inserted into a connecting hole of the second barrel illustrated in FIG. 3.

In this state, the screw 40 is inserted into the connecting hole 25 as illustrated in FIG. 4. The screw 40 may be replaced with a pin. A head of the screw 40 inside the connecting notch 17 supports the first flange 11, and due to the head of the screw 40, the first barrel 10 is not rotated in a direction in which the first barrel 10 is separated from the second flange 22 and is fixed. The head of the screw 40 may not necessarily contact the connecting notch 17 as long as a portion of the head of the screw 40 is located inside the connecting notch 17. The screw 40 may not contact the first barrel 10 in order to not apply a physical force to the first barrel 10.

As described above, when the screw 40 is used for the fixing, a physical force is not applied to the first barrel 10 on which the lens 30 is mounted. Thus, an array of the lens 30 is not changed in an assembling process.

Figure 5:
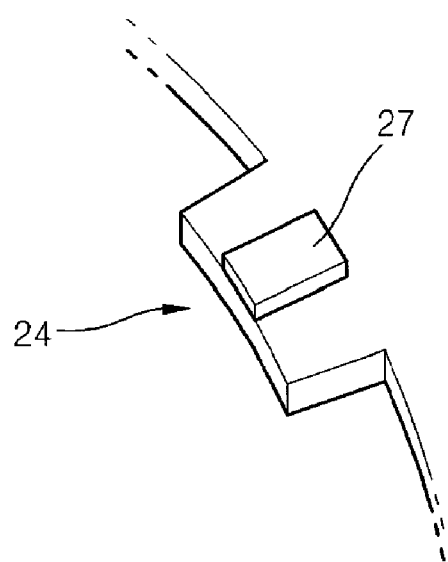
FIG. 5 is a bottom view of an embodiment of a support illustrated in FIG. 1.

The supports 24 supporting the third flange 13, as illustrated in FIG. 5, may be flat members, and a protrusion 27 may be formed on a surface of each of the supports 24 facing the third flange 13. Thus, when the supports 24 support the third flange 13, the protrusion 27 contacts and supports the third flange 13. One protrusion 27 may be formed on each of the supports 24, as illustrated in FIG. 5. However, in other embodiments, a plurality of protrusions 27 may be formed on each of the supports 24.

Due to the protrusion 27, the supports 24 do not contact the entire surface of the third flange 13, and only the protrusion 27 contacts the third flange 13. Thus, a machining accuracy of a mutual contact surface of the third flange 13 and the supports 24 can be compensated for. That is, when the third flange 13 is rotated in a state in which the entire surface of the supports 24 contacts the third flange 13, the flatness of the mutual contact surface of the supports 24 and the third flange 13 needs to be considered to obtain a high degree of machining accuracy. However, by forming the protrusion 27 on each of the supports 24 to reduce the mutual contact surface with respect to the third flange 13, even when the machining accuracy of the mutual contact surface between the supports 24 and the third flange 13 is low or the mutual contact surface has a spacing, such low accuracy or the spacing may be compensated for.

The protrusion 27 may be, as illustrated in FIG. 5, a rectangular parallelepiped extending in a direction in which the supports 24 protrude. In this case, the protrusion 27 may stably support the third flange 13 sufficiently.

Figure 6:
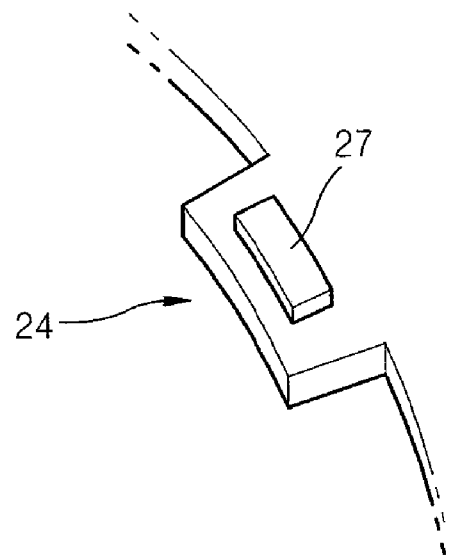
FIG. 6 is a bottom view of another embodiment of a support illustrated in FIG. 1.

However, in other embodiments, as illustrated in FIG. 6, the protrusion 27 may be rectangular parallelepiped extending in a widthwise direction of the supports 24. In this case, the supports 24 support the third flange 13 and simultaneously, since the protrusion 27 extends in a rotational direction of the first barrel 10, the rotational resistance of the first barrel 10 may be reduced.

Figure 7:
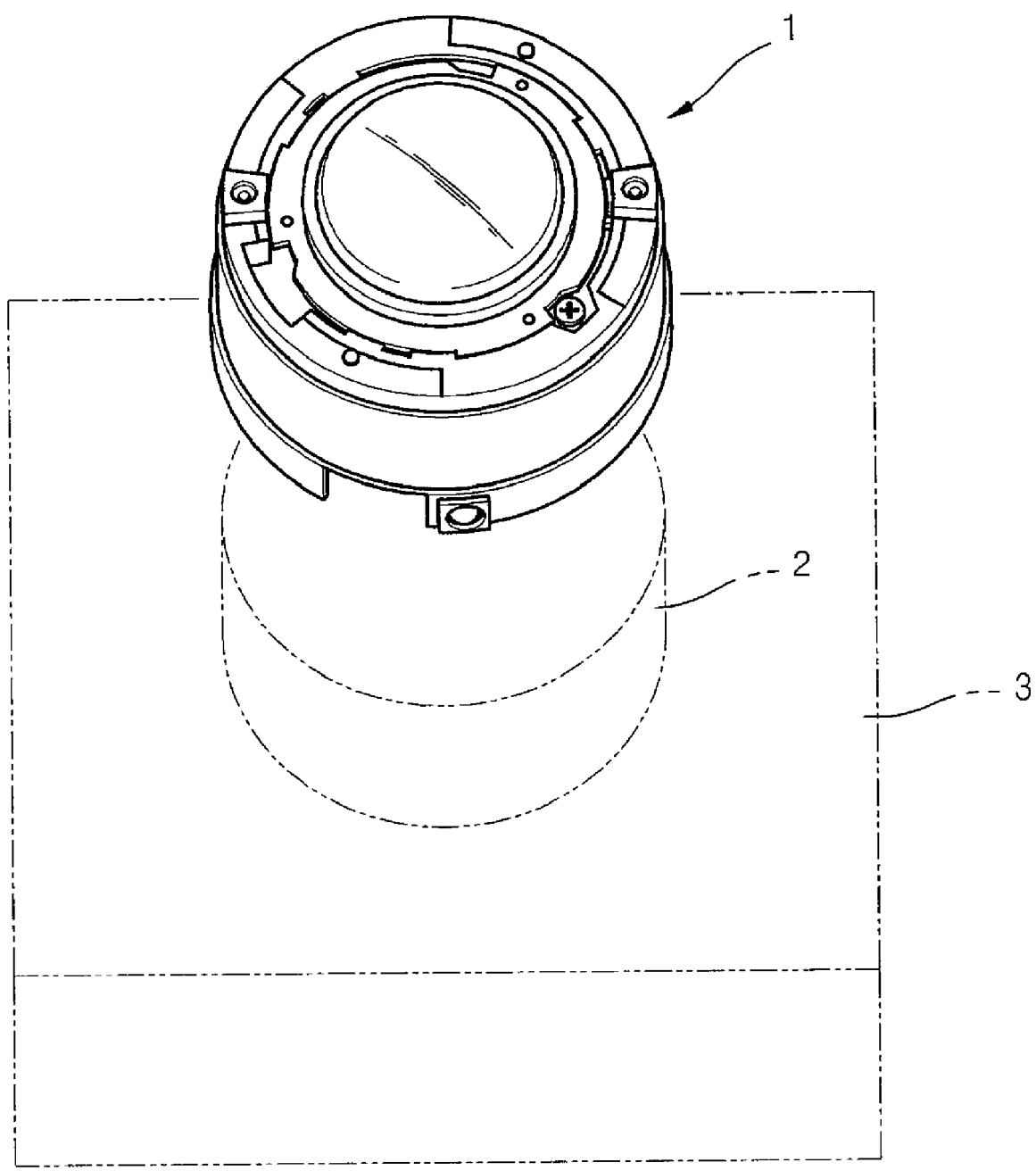
FIG. 7 is a perspective view of an optical device including a lens barrel, according to an embodiment of the present invention.

The lens barrel, as illustrated in FIG. 7, is used as a front lens barrel 1 and is combined with a rear lens barrel 2, and the combined front and second lens barrels 1 and 2 is then combined with a main body 3 of an optical device. In addition, another lens barrel (not shown) may be further interposed between the front lens barrel 1 and the rear lens barrel 2.

A barrel on which a lens is mounted is thus provided that can be simply assembled with and fixed to a mobile barrel, and when repaired, can be easily separated from the mobile barrel.

In addition, a physical force that is applied to the barrel on which a lens is mounted when the barrel on which a lens is mounted is assembled with the mobile barrel can be minimized and thus, in a dissembling process, a lens array is less likely to be changed.

Since a protrusion is present on a contact surface of the barrel on which a lens is mounted and the mobile barrel and the size of the contact surface is reduced, a degree of freedom of machining accuracy of the contact surface is high and a spacing can be adjusted.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components configured to perform the specified functions. The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. A lens barrel comprising:
    a first barrel comprising:
        a first cylinder that comprises a lens and is cylindrical, and
        a first flange formed around an outer surface of the first cylinder; and
    a second barrel comprising:
        a second cylinder that is cylindrical and aligned with respect to the first cylinder,
        a second flange that is formed on an inner surface of the second cylinder and supports one surface of the first flange, and
        a plurality of supports that protrude from the inner surface of the second cylinder in a direction parallel to a surface of the second flange and support another surface of the first flange.

2. The lens barrel of claim 1, wherein the first flange comprises a third flange that is inserted or removed from between the second flange and the supports when the first barrel is rotated.

3. The lens barrel of claim 2, wherein the first flange comprises a stopper on an end of the third flange to prevent the rotation of the first barrel.

4. The lens barrel of claim 1, wherein the length of at least a portion of the first flange is less than an interval between adjacent supports.

5. The lens barrel of claim 1, wherein the second cylinder comprises a connecting hole through which a screw or a pin passes, and the first flange comprises a connecting notch formed correspondingly to the connecting hole.

6. The lens barrel of claim 5, wherein a portion of the screw or pin inserted into the connecting hole is located in the connecting recess.

7. The lens barrel of claim 1, wherein the supports are flat members that protrude from the inner surface of the second cylinder, and that each comprises a protrusion that protrudes from a surface of the flat members facing the first flange and supports the another surface of the first flange.

8. An optical device comprising:
    a lens barrel comprising:
        a first barrel comprising:
            a first cylinder that comprises a lens and is cylindrical, and
            a first flange formed around an outer surface of the first cylinder, and
        a second barrel comprising:
            a second cylinder that is cylindrical and aligned with respect to the first cylinder,
            a second flange that is formed on an inner surface of the second cylinder and supports one surface of the first flange, and
            a plurality of supports that protrude from the inner surface of the second cylinder in a direction parallel to a surface of the second flange and support another surface of the first flange; and a main body on which the lens barrel is mounted.

9. The optical device of claim 8, wherein the first flange comprises a third flange that is inserted or removed from between the second flange and the supports when the first barrel is rotated.

10. The optical device of claim 9, wherein the first flange comprises a stopper on an end of the third flange to prevent the rotation of the first barrel.

11. The optical device of claim 8, wherein a length of at least a portion of the first flange is less than an interval between adjacent supports.

12. The optical device of claim 8, wherein the second cylinder comprises a connecting hole through which a screw or a pin passes, and the first flange comprises a connecting notch formed correspondingly to the connecting hole.

13. The optical device of claim 12, wherein a portion of the screw or pin inserted into the connecting hole is located in the connecting recess.

14. The optical device of claim 8, wherein the supports are flat members that protrude from the inner surface of the second cylinder, and each of the supports comprises a protrusion that protrudes from a surface of the flat members facing the first flange and supports the another surface of the first flange.

* * * * *